W. H. PROUTY.
Curry Comb.
No. 79,596.
Patented July 7, 1868.
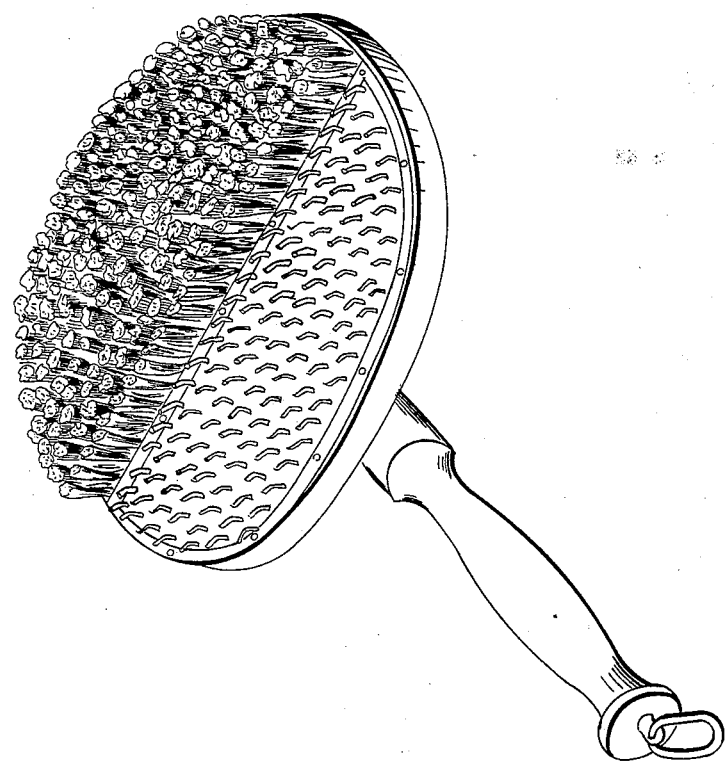
Witnesses,
Inventor.
William H. Prouty

United States Patent Office.

WILLIAM H. PROUTY, OF HANSON, MASSACHUSETTS.

Letters Patent No. 79,596, dated July 7, 1868.

IMPROVED COMBINED CARD AND BRUSH.

The Schedule referred to in these Letters Patent and making part of the same.

TO ALL WHOM IT MAY CONCERN:

Be it known that I, WILLIAM H. PROUTY, of Hanson, in the county of Plymouth, and State of Massachusetts, have invented a new and useful article consisting of a Card and Brush, or Curry-Comb and Brush combined, for the purpose of grooming and cleaning horses and other cattle; and I do hereby declare that the following is a full and exact description thereof, reference being had to the accompanying drawings.

The nature of my invention consists in making use of a piece of wood, or other material, with a suitable handle; the one-half thereof to be prepared with metal teeth for combing or carding; the other half to be prepared with bristles, or other substances, for brushing; so that the process of combing or carding and brushing may be performed simultaneously.

What I claim is—

The combination of the card or comb and brush in one instrument, to be used together at the same time, for the purposes specified.

WILLIAM H. PROUTY.

Witnesses:
DANIEL NEEDHAM,
DAVID ROBERTS.